(12) United States Patent
Damour

(10) Patent No.: US 7,217,035 B2
(45) Date of Patent: May 15, 2007

(54) CONNECTING ROD-BEARING COMBINATION FOR ADJUSTING AND REDUCING OSCILLATING MASSES OF A CONNECTING ROD-PISTON-COMBINATION AND METHOD FOR PRODUCING A CONNECTING ROD-BEARING COMBINATION OF THIS TYPE

(75) Inventor: Philippe Damour, Frankfurt (DE)

(73) Assignee: Federal-Mogul Wiesbaden GmbH & Co. KG, Wiesbaden (DE)

( * ) Notice: Subject to any disclaimer, the term of this patent is extended or adjusted under 35 U.S.C. 154(b) by 96 days.

(21) Appl. No.: 10/482,198

(22) PCT Filed: Apr. 26, 2002

(86) PCT No.: PCT/DE02/01547

§ 371 (c)(1),
(2), (4) Date: Dec. 23, 2003

(87) PCT Pub. No.: WO03/004886

PCT Pub. Date: Jan. 16, 2003

(65) Prior Publication Data

US 2004/0175064 A1 Sep. 9, 2004

(30) Foreign Application Priority Data

Jul. 5, 2001 (EP) .................................. 10132632

(51) Int. Cl.
*F16C 7/00* (2006.01)
*B21D 53/84* (2006.01)
(52) U.S. Cl. .................. 384/429; 74/579 E; 29/888.09
(58) Field of Classification Search ................ 384/429, 384/430, 294; 29/888.051, 888.09, 888.091, 29/888.092; 123/197.3, 197.4; 92/187, 92/179, DIG. 1; 408/707; 74/579 E
See application file for complete search history.

(56) References Cited

U.S. PATENT DOCUMENTS

| | | | | |
|---|---|---|---|---|
| 3,529,510 A | * | 9/1970 | Bucey | 408/2 |
| 3,739,657 A | * | 6/1973 | Patchen et al. | 74/587 |
| 3,932,053 A | * | 1/1976 | Hack | 29/558 |
| 4,494,286 A | * | 1/1985 | Kaufman | 29/888.09 |

(Continued)

FOREIGN PATENT DOCUMENTS

DE 24 33929 A1 2/1976

(Continued)

*Primary Examiner*—Thomas R. Hannon
(74) *Attorney, Agent, or Firm*—Robert L. Stearns; Dickinson Wright PLLC

(57) ABSTRACT

The invention relates to a connecting rod-bearing combination comprising a bearing for a small connecting rod eye of a connecting rod which serves to receive a piston pin that supports a piston. The invention also relates to a method for producing a connecting rod-bearing combination of the aforementioned type. The aim of the invention is to be able to exert an influence on the connecting rod-piston combination whereby enabling a fine tuning of the oscillating masses. To this end, the invention provides a connecting rod-bearing combination, which is post-machined in the area of the small connecting rod eye during which material is removed form a mass that corresponds to the difference between the oscillating mass of the connecting rod-bearing combination and a stipulated oscillating mass. The method for producing the connecting rod-piston combination is characterized in that during the removal of material, it is determined how much material mass on the connecting rod-bearing combination is to be removed in order to obtain a stipulated connecting rod-piston combination of a specified mass and mass distribution. The connecting rod-bearing combination is subsequently post-machined in the area of the small connecting rod eye during which material is removed to the extent of the determined mass.

9 Claims, 2 Drawing Sheets

U.S. PATENT DOCUMENTS

| | | |
|---|---|---|
| 4,533,261 A | 8/1985 | Losio |
| 4,652,150 A | 3/1987 | New |
| 5,370,093 A * | 12/1994 | Hayes .................... 123/197.4 |
| 5,435,059 A * | 7/1995 | Chawla .................. 29/888.08 |
| 5,758,550 A | 6/1998 | Lenczyk |

FOREIGN PATENT DOCUMENTS

| | | |
|---|---|---|
| DE | G 87 12 192.1 | 11/1987 |
| DE | 42 42 508 A1 | 6/1994 |
| GB | 1 574 377 | 8/1977 |
| GB | 2330788 A * | 5/1999 |
| JP | 60231010 A * | 11/1985 |
| JP | 05272525 A * | 10/1993 |
| WO | WO 00/00761 | 1/2000 |

* cited by examiner

CONNECTING ROD-BEARING COMBINATION FOR ADJUSTING AND REDUCING OSCILLATING MASSES OF A CONNECTING ROD-PISTON-COMBINATION AND METHOD FOR PRODUCING A CONNECTING ROD-BEARING COMBINATION OF THIS TYPE

BACKGROUND OF THE INVENTION

1. Technical Field

The invention relates to a connecting rod/bearing combination having a bearing (1) for a small connecting rod eye (6) of a connecting rod (5), which serves to accommodate a piston pin mounting a piston and a method of producing such a connecting rod/bearing combination.

2. Related Art

The background of the invention is the problem of the mass forces arising in a driving mechanism. In the context of the present invention, a driving mechanism should be understood to mean the system consisting of piston, connecting rod and crankshaft, as used for example as a crank mechanism in internal combustion engines.

Irregular movements of masses, i.e. accelerated and decelerated movements, involve mass or inertial forces. The piston of an internal combustion engine moves substantially in a straight line in the direction of the axis of the cylinder liner and effects an oscillating movement. In the process, it is exposed to constantly varying accelerations, which reach their maximum at the reversal points of the piston movement, the top and bottom dead centers. Corresponding to the rectilinear movement of the piston, the accelerations and with them the inertial forces are directed in the direction of the cylinder liner axis.

In contrast to the piston, the crank effects not an oscillating but a rotating movement. The inertial forces acting thereon are the centrifugal forces produced during rotary motion by the constant change in direction.

The most complex movement of the three components forming the crank mechanism is performed by the connecting rod. Movement of the connecting rod is a composite movement and comprises components of both oscillating and rotary motion.

Figure 1:
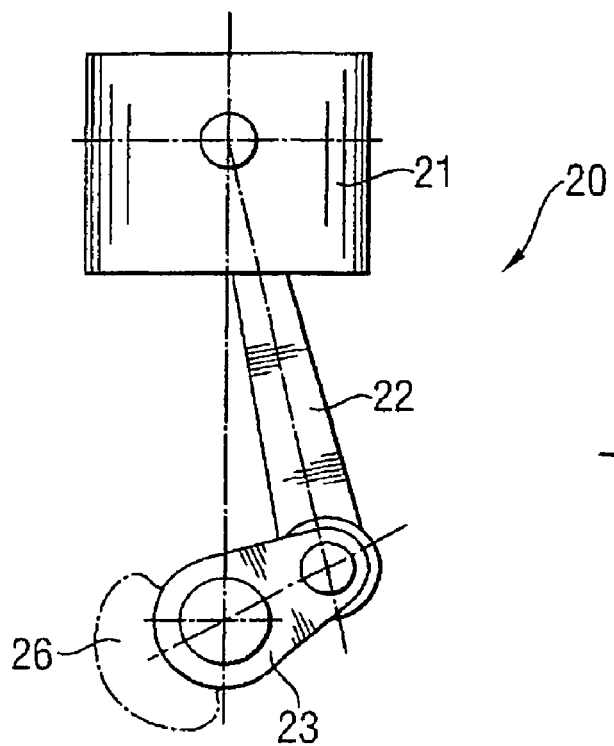
FIG. 1 is a schematic representation of a driving mechanism (20) having a piston (21), a connecting rod (22) and a crank (23). A counterweight (26) is shown in dash-dotted lines.

The background to this equivalent system is that the connecting rod mass $m_P$ may be broken down relative to the mass action of the connecting rod into an oscillating mass $m_{ph}$ and a rotating mass $m_{Pr}$. These equivalent masses are conventionally determined according to the following equations:

$$m_P = m_{Pr} + m_{Ph}$$

$$m_{Pr} \times l_1 = m_{Ph} \times l_2,$$

wherein $l_1$, $l_2$ indicate the spacing of the center of gravity of the connecting rod from the equivalent point masses.

The oscillating equivalent mass $m_h$ (24) is obtained from the sum of the piston mass $m_K$ and the oscillating connecting rod mass $m_{Ph}$. Accordingly, the rotating equivalent mass $m_r$ (25) is obtained from the sum of the rotating connecting rod equivalent mass $m_{Pr}$ and the shaft cranked portion mass $m_{Kur}$ reduced to the crank radius r, which is calculated as:

$$m_{Kur} = m_{Ku} r_1 / r$$

Here, $r_1$ is the spacing of the center of gravity of the cranked portion (23) of the shaft from the axis of rotation of the crankshaft, $m_{Ku}$ is the mass of the cranked portion of the shaft and r is the crank radius.

The mass forces, which are produced by the rotating mass $m_r$ (25), may be simply counterbalanced by an opposing counterweight (26). On the other hand, minimization or compensation of the inertial forces produced by the oscillating mass $m_h$ (24) is problematic.

In general, research and development work is aimed at reducing the masses of all oscillatingly moved parts, in particular the piston, since compensation of the mass forces produced thereby cannot be handled by the arrangement of counterweights. On the one hand, redesign of the reciprocating components using the smallest possible amount of material is necessary, while on the other hand the use of new materials of lower relative density will also achieve the objective.

However, this procedure is also subject to limitations due to strength requirements, such that it becomes ever more difficult to minimize the oscillating masses and the mass inertial forces caused thereby.

In the case of multi-cylinder engines, it is possible to influence the mass forces or the effect thereof by the number of cylinders, the cylinder arrangement, the crank sequence of the crankshaft and/or the ignition sequence.

If, for example, in the case of a multi-cylinder engine, it is intended to compensate the mass forces by means of a cylinder arrangement selected for this reason, this ideally requires the same driving mechanisms for all the cylinders, comprising the same weight or the same weight distribution. It is thus ensured that the driving mechanisms used in one and the same engine produce uniformly large mass forces, especially uniformly large oscillating or rotary mass forces.

For manufacturing reasons, the components used do not exhibit exactly the desired weight or the desired weight distribution, and thus nor do the driving mechanisms composed thereof.

The prior art has attempted to compensate the deviation, caused by manufacture, of the individual components with regard to mass and mass distribution as follows:

connecting rod and piston are subjected in each case individually to a selection process, in which they are divided into a large number of weight categories, and connecting rod and piston are then grouped, with the objective of achieving similar connecting rod/piston combinations, wherein the connecting rod comprises counterweights both at the connecting rod eye and at the connecting rod head, which are machined to achieve exact adjustment of the mass or mass distribution of the connecting rod/piston combinations.

In the process, it is necessary to take into account the fact that the counterweights which are provided at the connecting rod eye and at the connecting rod head and are also known as cams increase the total weight of the connecting rod and thus the total weight of the driving mechanism. This means that merely providing these counterweights for the purpose of adjusting the mass or mass distribution increases the weight and is thus inconsistent with the real objective of minimizing the masses of all the moving components.

For this reason, the attempt has been made to provide high-precision manufacturing methods with which low tolerances may be achieved. By reducing or decreasing the manufacturing tolerances, the differences between the components of a particular type are reduced at the same time, such that the size of the counterweights to be provided may likewise be reduced.

Production of the connecting rod with lower mass or mass distribution tolerances has been made possible by more recent methods, such that the number of weight categories necessary for selection has been greatly reduced and, in the case of maximally optimized processes, only connecting rods of one weight class remain.

When grouping these connecting rods with the associated pistons to form a connecting rod/piston combination, compensation of the connecting rod mass tolerances is effected by the piston. Nevertheless, there is a requirement for precision fine-tuning of the oscillating masses.

SUMMARY OF THE INVENTION

Against this background, it is the object of the invention to provide a possible way of influencing the connecting rod/piston combination by means of which fine-tuning of the above-mentioned type may be performed.

This object is achieved by a connecting rod/bearing combination in which the connecting rod/bearing combination is post-machined in the area of the small connecting rod eye in such a way that material is removed of a mass which corresponds to the difference between the oscillating mass of the connecting rod/piston combination and a predetermined oscillating mass.

In advantageous embodiments of the connecting rod/bearing combination, the bearing is a bushing provided in the small connecting rod eye. If material is removed incorrectly, especially if too much material is removed, the shortcoming may be readily remedied by replacing the bushing, whilst the connecting rod may continue to be used.

In advantageous embodiments of the connecting rod/bearing combination, the bearing is a plain bearing coating applied to the small connecting rod eye. When the material is removed, the bearing cannot slip, for example rotate in the manner of a bushing.

The bearing, i.e. the bushing or the plain bearing coating, is arranged in the connecting rod eye of the connecting rod and serves as bearing arrangement for the piston pin. Both the bearing and the piston pin are included with their masses completely in the oscillating mass of the driving mechanism. A reduction in their masses contributes to a reduction in the oscillating masses and thus allows adjustment thereof. The connecting rod is likewise included completely in the oscillating mass in the area of the small connecting rod eye.

The bearing or the connecting rod in the area of the small connecting rod eye is then used for fine-tuning according to the invention.

Connecting rod/bearing combinations are preferable in which the material is removed from the bearing. This gets round the removal of connecting rod material, such that there is no risk of excessively reducing the strength of the connecting rod in the area of the small connecting rod eye. This is important, given the fact that the connecting rod supports or carries the bearing and is one of the most highly loaded components precisely in the area of the small connecting rod eye. Furthermore, removal of material is more or less noticeable as a notch, depending on the form selected.

Connecting rod/bearing combinations are also favorable, however, in which the material is removed from the connecting rod. The removal of material from the bearing is limited in magnitude by the generally low weight of the bearing itself. In this way, and due to the other aspects to be taken into account, such as bearing strength and very largely tabooed loading zones of the bearing, tight limits are set to the amount of material which may be removed. Accordingly, if a large amount of material is to be removed, it is advisable for it to be removed from the connecting rod.

Embodiments of the connecting rod/bearing combination are preferable in which the connecting rod/bearing combination is post-machined in such a way that it comprises at least one recess.

This connecting rod/bearing combination according to the invention is based on the concept that a recess arranged in the area of the small connecting rod eye and formed by material removal leads to a reduction in the weight of the oscillating masses, so achieving tuning of the connecting rod/piston combination. This in turn allows achievement of the objective of compensation of the mass forces acting on the driving mechanism.

Embodiments of the connecting rod/bearing combination are preferable in which the recess, of which there is at least one, is arranged in the areas of the bearing subject to low load, wherein the material may be removed both from the connecting rod and the bearing.

Experience shows that the areas of the bearing subject to low load lie in the areas which, measured perpendicularly to the longitudinal axis of the connecting rod, exhibit the greatest distance from the longitudinal axis of the connecting rod. This preferred arrangement of the at least one recess takes account of the fact that a recess causes a greater or lesser notch effect, depending on the shape thereof, and leads to a reduction in the strength of the bearing and/or the connecting rod at least in the area immediately adjoining said recess.

Embodiments of the connecting rod/bearing combination are favorable in which the recess, of which there is at least one, extends in elongate manner in the circumferential direction of the bearing.

Embodiments of the connecting rod/bearing combination are preferable in which the recess, of which there is at least one, is arranged centrally between the two end faces of the bearing, i.e. the bushing or the plain bearing coating.

A central arrangement of the recess without the recess being open towards the end faces of the bearing allows the recess to be used as an oil reservoir.

The present invention also relates to the method of producing the connecting rod/bearing combination according to the invention.

In the method according to the invention for producing a connecting rod/bearing combination, material is removed in such a manner that the small connecting rod eye of the connecting rod is provided with a bearing, in particular with a bushing or a plain bearing coating, and this connecting rod/bearing combination is put together with a piston, with the addition of the necessary accessories such as piston pins and the like, to form a connecting rod/piston combination, and it is then determined how much material mass needs to be removed from the connecting rod/bearing combination to achieve a predetermined connecting rod/piston combination of given mass and mass distribution, and then the connecting rod/bearing combination is post-machined in the area of the small connecting rod eye in such a manner that material is removed to the extent of the determined mass.

The post-machining performed is conformed to each specific individual case, such that the depth and size of the recess may vary as a function of the determined mass and mass distribution of the respective connecting rod/piston combination.

The material is removed from the connecting rod or from the bearing or from the connecting rod and the bearing.

Embodiments of the method are advantageous in which post-machining is performed, in the case of a bushing, on the bushing mounted in the small connecting rod eye. This makes it unnecessary to remove the bushing from the small connecting rod eye again for the purpose of post-machining. Consequently, the total number of method steps is reduced, thereby reducing production costs. In addition, removing the bushing again would lead to inaccuracies, since identical re-insertion is impossible.

Methods are advantageous in which post-machining of the connecting rod/bearing combination is performed in such a way that at least one recess is formed.

Methods are favorable in which material is removed by milling to form the recess, of which there is at least one.

Embodiments of the method are preferable in which material is removed by vibratory grinding to form the recess, of which there is at least one.

Methods are preferable in which material is removed by laser to form the recess, of which there is at least one.

In methods of producing a connecting rod/bearing combination with a multilayer bearing, which comprises at least one backing layer and one overlay, embodiments of the method are advantageous in which the material is removed from the bearing overlay.

The overlay forms the inner contour of the bearing and is thus the surface of the bearing facing the piston pin and on which the lubricant film forms. By removing material from the bearing overlay, the strength of the bearing, which is derived substantially from the backing layer, is reduced only slightly. In addition, the possibility is opened up of using a recess formed in the overlay by material removal as a reservoir for the lubricant used.

The invention will be explained in more detail with reference to an exemplary embodiment according to the following drawings, in which:

BRIEF DESCRIPTION OF THE INVENTION

Figure 2:
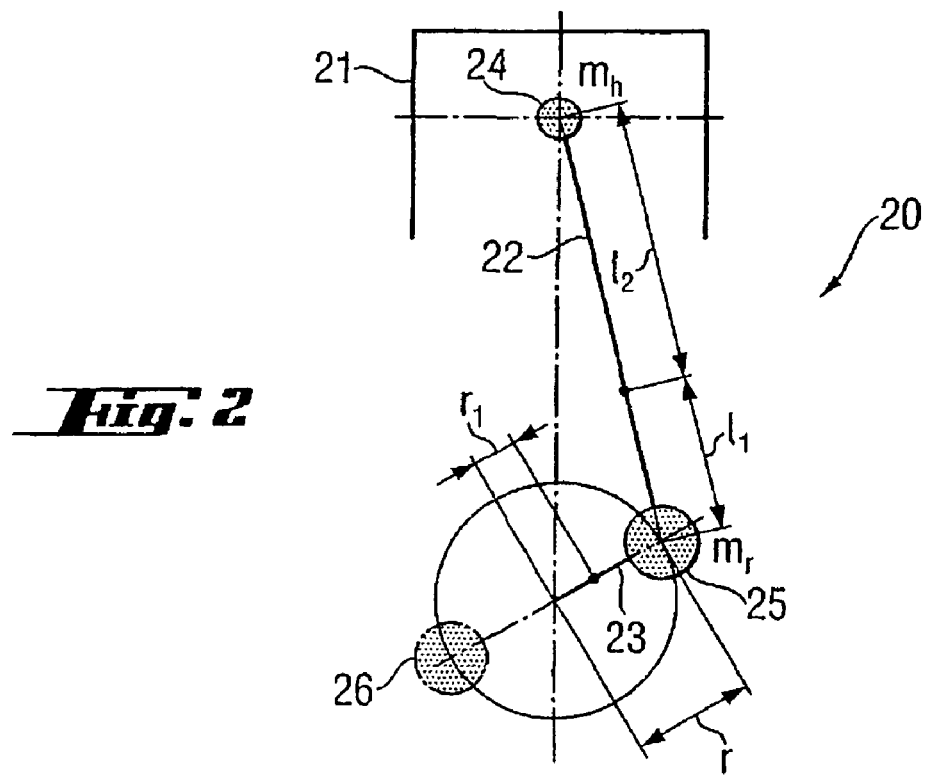
FIG. 2 shows an equivalent system for the driving mechanism (20) shown in FIG. 1, wherein the equivalent system is composed of two point masses (24, 25), of which one sub-mass $m_h$ (24) is arranged in the piston pin center and performs oscillating motion and one sub-mass $m_r$ (25) is arranged in the center of the cranked portion (23) of the shaft and effects rotary motion with the crankshaft.
Figure 3:
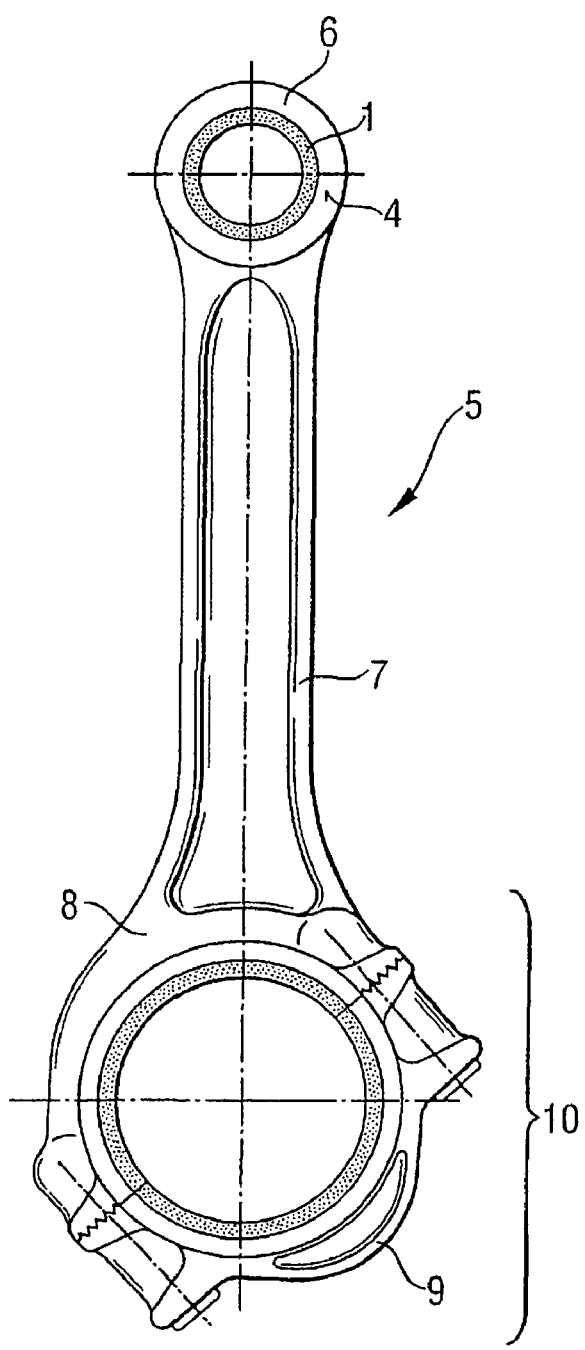
Figure 4:
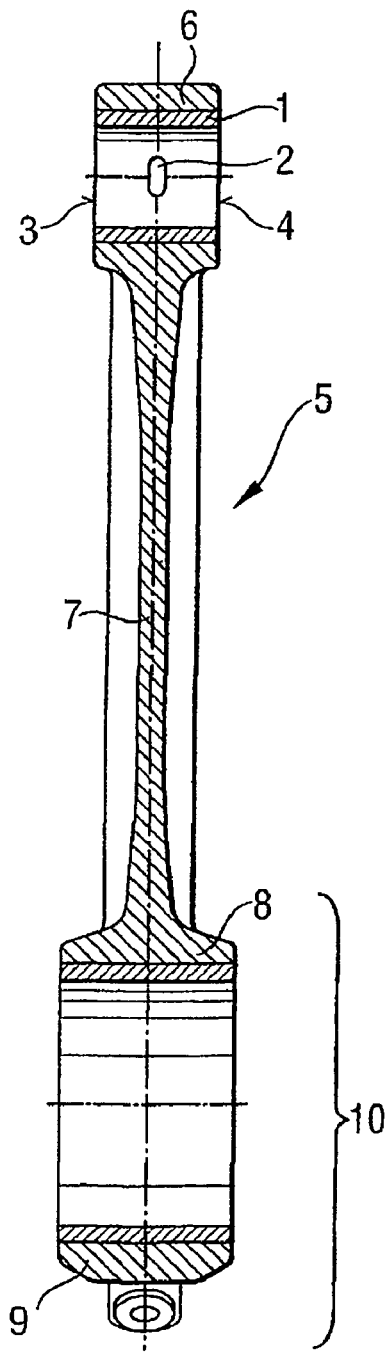

FIG. 1 is a schematic representation, in side view, of a driving mechanism of an internal combustion engine, and FIG. 2 is a schematic representation, in side view, of an equivalent system for the driving mechanism shown in FIG. 1, and FIG. 3 is a side view of a connecting rod, viewed in the direction of the connecting rod eye axis, and FIG. 4 is a side view of a connecting rod, viewed in the direction perpendicular to the connecting rod eye axis and in section.

FIGS. 1 and 2 have already been explained.

DETAILED DESCRIPTION OF THE INVENTION

The connecting rod 5 shown in FIG. 3 is illustrated in side view, wherein it is observed in the direction of the connecting rod eye axis. It comprises a small connecting rod eye 6, which is always of closed construction and is connected to the connecting rod head 10 via the connecting rod shank 7. The connecting rod head 10 is of split construction for the purpose of mounting the connecting rod 5 on the crankshaft. The connecting rod 5 shown in FIG. 3 has a transversely split connecting rod head 10, which consists of the foot 8 of the connecting rod and the connecting rod cap 9.

The bearing 1, which may be a bushing or a plain bearing coating, is arranged in the small connecting rod eye 6. This bearing 1 serves in turn to accommodate a piston pin, not shown. The plain bearing bushing 1 illustrated in FIG. 3 is a one-piece bushing 1. FIG. 3 shows an end face 4 of the connecting rod 5, while the recess arranged in the bushing 1 is not visible in side view.

To this end, the connecting rod 5 is shown in section in FIG. 4, said section being taken along the longitudinal axis of the connecting rod and containing the connecting rod eye axis.

The plain bearing bushing 1 with its outward facing end faces 3, 4 is illustrated in the installed state, i.e. incorporated into the small connecting rod eye 6. The embodiment of the plain bearing bushing 1 illustrated in FIG. 4 comprises a recess 2. This recess is located in an area of the bushing 1 subject to low load and extends in elongate manner in the circumferential direction of the bushing 1. It is arranged centrally between the two end faces 3, 4 of the bushing 1 and may thus also serve as an oil reservoir.

LIST OF REFERENCE NUMERALS

1 Bearing
2 Recess
3 End face
4 End face
5 Connecting rod
6 Small connecting rod eye
7 Connecting rod shank
8 Connecting rod saddle
9 Connecting rod cap
10 Connecting rod head
20 Driving mechanism
21 Piston
22 Connecting rod
23 Cranked portion of shaft
24 Oscillating equivalent mass $m_h$
25 Rotating equivalent mass $m_r$
26 Counterweight

The invention claimed is:

1. A method of producing a connecting rod/bearing combination having a bearing for a small connecting rod eye of a connecting rod, which serves to accommodate a piston pin mounting a piston, wherein the connecting rod/bearing combination is post-machined in the area of the small connecting rod in such a way that material is removed of a mass which corresponds to the difference between the oscillating mass of the connecting rod/piston combination and a predetermined oscillating mass, wherein the material is removed in such a way that:

the small connecting rod eye of the connecting rod is provided wit a bearing selected from a group consisting of a bushing and a plain bearing layer to form a connecting rod/bearing combination, and this connecting rod/bearing combination is put together with a piston and a piston pin to form a connecting rod/bearing/piston combination, and it is then determined how much material mass needs to be removed from the connecting rod/bearing/piston combination to achieve a predetermined connecting rod/bearing/piston combination of given mass and mass distribution, and then the connecting rod/bearing combination is post-machined in the area of the small connecting rod eye in such a manner that material is removed to the extend of the determined mass.

2. The method of producing a connecting rod/bearing combination as claimed in claim 1, wherein the material is removed from the bearing.

3. The method of producing a connecting rod/bearing combination as claimed in claim 1, wherein the material is removed from the connecting rod.

4. The method of producing a connecting rod/bearing combination as claimed in claim 1 wherein the material is removed from the connecting rod and the bearing.

5. The method of producing a connecting rod/bearing combination as claimed in claim 1 wherein post-machining of the connecting rod/bearing combination is performed in such a way that at lest one recess is formed.

6. The method of producing a connecting rod/bearing combination as claimed in claim 5, wherein material is removed by milling to form the recess, of which there is at least one.

7. The method of producing a connecting rod/bearing combination as claimed in claim 5, wherein material is removed by vibratory grinding to form the recess, of which there is at least one.

8. The method of producing a connecting rod/bearing combination as claimed in claim 5, wherein material is removed by laser to form the recess, of which there is at least one.

9. The method for producing a connecting rod/bearing combination as claimed in claim 1, wherein the bearing is a multilayer bearing, which comprises at least one backing layer and one overlay, and wherein material is removed form the overlay of the bearing.

* * * * *

UNITED STATES PATENT AND TRADEMARK OFFICE
CERTIFICATE OF CORRECTION

PATENT NO.        : 7,217,035 B2
APPLICATION NO. : 10/482198
DATED             : May 15, 2007
INVENTOR(S)      : Philippe Damour It is certified that error appears in the above-identified patent and that said Letters Patent is hereby corrected as shown below:

Abstract, line 12: "removed form a mass that" should read --removed from a mass that--.

Column 6, line 60: "provided wit a bearing" should read --provided with a bearing--.

Column 7, line 6: "removed to the extend of" should read --removed to the extent of--.

Column 7, line 15: "claimed in claim 1 wherein" should read --claimed in claim 1, wherein--.

Column 7, line 18: "claimed in claim 1 wherein" should read --claimed in claim 1, wherein--.

Column 8, line 16: "material is removed form" should read --material is removed from--.

Signed and Sealed this

Thirteenth Day of November, 2007

JON W. DUDAS
*Director of the United States Patent and Trademark Office*